United States Patent
Hammad (10) Patent No.: US 11,107,053 B2
(45) Date of Patent: *Aug. 31, 2021

(54) SYSTEM AND METHOD FOR SECURELY VALIDATING TRANSACTIONS

(71) Applicant: Visa International Service Association, San Francisco, CA (US)

(72) Inventor: Ayman Hammad, Pleasanton, CA (US)

(73) Assignee: Visa International Service Associate, San Francisco, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/447,473

(22) Filed: Jun. 20, 2019

(65) Prior Publication Data
US 2019/0303891 A1 Oct. 3, 2019

Related U.S. Application Data

(63) Continuation of application No. 13/081,871, filed on Apr. 7, 2011, now Pat. No. 10,373,138.
(Continued)

(51) Int. Cl.
*G06Q 20/12* (2012.01)
*G06Q 30/06* (2012.01)
(Continued)

(52) U.S. Cl.
CPC .......... *G06Q 20/12* (2013.01); *G06Q 20/385* (2013.01); *G06Q 20/4018* (2013.01);
(Continued)

(58) Field of Classification Search
None
See application file for complete search history.

(56) References Cited

U.S. PATENT DOCUMENTS

| 5,805,702 A | 9/1998 | Curry et al. |
| 7,275,685 B2 | 10/2007 | Gray et al. |

(Continued)

FOREIGN PATENT DOCUMENTS

| CN | 1753011 | 3/2006 |
| CN | 101502031 | 8/2009 |

(Continued)

OTHER PUBLICATIONS

PCT/US2011/031426 , "International Search Report and Written Opinion", dated Dec. 15, 2011, 12 pages.
(Continued)

*Primary Examiner* — Elda G Milef
*Assistant Examiner* — Gregory S Cunningham, II
(74) *Attorney, Agent, or Firm* — Kilpatrick Townsend & Stockton LLP (57) ABSTRACT

Systems and methods for validating and processing payment transactions are disclosed. In the embodiments of the invention a first authorization request message and a first verification value are received at a server computer. The verification value is validated and a second authorization request message with a second verification value is generated. The first verification value may be a dynamic value and the second verification value may be static value. The second verification value is associated with portable device used to perform a transaction and it is what the issuer computers of the portable device expect to receive as part of an authorization request message in a payment transaction.

20 Claims, 8 Drawing Sheets

Related U.S. Application Data (60) Provisional application No. 61/322,677, filed on Apr. 9, 2010.

(51) Int. Cl.
      *H04L 9/32*       (2006.01)
      *G06Q 20/38*      (2012.01)
      *G06Q 20/40*      (2012.01)
      *G06Q 20/42*      (2012.01)

(52) U.S. Cl.
     CPC ........... *G06Q 20/425* (2013.01); *G06Q 30/06* (2013.01); *H04L 9/3234* (2013.01); *H04L 2209/56* (2013.01)

(56) References Cited

U.S. PATENT DOCUMENTS

| | | |
|---|---|---|
| 7,707,120 B2 | 4/2010 | Dominguez et al. |
| 7,891,560 B2 | 2/2011 | Hammad |
| 8,020,766 B2 | 9/2011 | Hammad |
| 8,326,759 B2 | 12/2012 | Hammad |
| 10,373,138 B2 * | 8/2019 | Hammad ............... G06Q 20/12 |
| 2003/0200184 A1 * | 10/2003 | Dominguez ....... G06Q 20/3674 705/78 |
| 2006/0006226 A1 | 1/2006 | Fitzgerald et al. |
| 2007/0250920 A1 | 10/2007 | Lindsay |
| 2009/0048971 A1 * | 2/2009 | Hathaway ............. G07F 7/1008 705/41 |
| 2009/0055893 A1 | 2/2009 | Manessis et al. |
| 2009/0119504 A1 | 5/2009 | van Os et al. |
| 2009/0173782 A1 | 7/2009 | Muscato |
| 2009/0313168 A1 | 12/2009 | Manessis |
| 2009/0319430 A1 | 12/2009 | Faith et al. |
| 2010/0063895 A1 | 3/2010 | Dominguez et al. |
| 2010/0274692 A1 | 10/2010 | Hammad |
| 2010/0293382 A1 | 11/2010 | Hammad et al. |
| 2011/0108623 A1 | 5/2011 | Hammad |
| 2011/0125642 A1 | 5/2011 | Kamal |
| 2011/0270757 A1 | 11/2011 | Hammad |

FOREIGN PATENT DOCUMENTS

| | | |
|---|---|---|
| CN | 102792325 | 11/2012 |
| EP | 2098985 A2 | 9/2009 |
| EP | 2098985 A3 | 9/2009 |
| KR | 1020040098477 | 11/2004 |
| KR | 1020050103681 | 11/2005 |
| RU | 2580086 | 4/2016 |
| WO | 2009042483 | 4/2009 |

OTHER PUBLICATIONS

Extended European Search Report dated Dec. 12, 2013 for EP Patent Application No. 11766661.0, 6 pages.

\* cited by examiner

SYSTEM AND METHOD FOR SECURELY VALIDATING TRANSACTIONS

The present application is a continuation of U.S. patent application Ser. No. 13/081,871, filed Apr. 7, 2011, which is a non-provisional application of and claims priority to U.S. Provisional Application No. 61/322,677, filed on Apr. 9, 2010, the entire disclosures of which are incorporated herein by reference for all purposes.

BACKGROUND

There is a need for more secure data transfer when paying for goods and services using payment cards such as debit and credit cards.

In a typical payment transaction, a user may use a credit card to purchase an item at a merchant or enter his account information into a payment page of a merchant's website. The merchant then generates an authorization request message using a POS (point of sale) terminal when the user is present at the merchant location. Alternatively, for an online transaction, the merchant website may generate an authorization request message for card-not-present (CNP) transactions. In either instance, the authorization request message is passed to the issuer computer of the credit card, and the issuer computer may approve or deny the request to authorize the transaction.

There are a variety of methods by which fraudsters attempt to obtain account information of users for conducting fraudulent transactions. To address this problem, payment transactions can be made partially dependent on data that are not part of the account information stored in a user's debit or credit card, or data that are not part of information that are typically provided by a user to a payment page of a merchant's website.

However, modifications to combat the fraudsters can be costly. For example, it can be costly to modify all issuer computers to accommodate such fraud prevention measures. Therefore, there is a need for systems and methods which can provide for more security for payment transactions without requiring issuer to modify their computers.

Embodiments of the invention address these and other problems, both individually and collectively.

BRIEF SUMMARY

Embodiments of the invention are directed to methods, systems, and devices for processing transactions.

One embodiment of the invention is directed to receiving a first authorization request message comprising a first verification value, determining whether the first verification value is valid, creating a second authorization request message comprising a second verification value, and sending the second authorization request message to a server computer.

Another embodiment of the invention is directed to sending a validation indicator to the server computer, wherein the validation indicator indicates whether the first verification value is valid.

Another embodiment of the invention is directed to determining whether the first authorization request message includes a static verification value associated with a portable device when the first verification value is not valid.

Another embodiment of the invention is directed to receiving an authorization request message associated with a payment transaction from a first server computer, receiving a validation indicator from the first server computer, wherein the validation indicator indicates whether a verification value associated with the payment transaction is valid, and generating an authorization response message based on the validation indicator.

These and other embodiments of the invention are described in further detail below.

DETAILED DESCRIPTION

In order to provide more security for electronic transactions, data that are not part of the account information and stored in a user's debit or credit card, and that are not readily available may be used during the processing of electronic transactions. Such data can be generated by an external source and introduced into the transaction process at any point, and then verified by a processing entity to make sure that the transaction has originated from an authorized source. At some point, before the transaction data reaches an issuer computer operated by an issuer, a processing entity can replace the data that are not part of the account information, with the data that the issuer computer excepts to receive. In this way, the processing entity can provide for more security and authenticate the transaction without forcing the issuer computer to make changes to their current method of processing the transactions and without requiring changes to their computer.

The following disclosure provides exemplary systems and methods for processing a purchase transaction, using authorization messages with different data elements. One authorization request message may be include a dynamic verification value (dCVV2), while the other authorization request message may include a static verification value (CVV2).

In one embodiment of the invention, a user communicates with an IP Gateway server computer via a client computer through a first communication channel. The user then provides account information from a chip in a portable device (e.g., a contactless payment card) to the client computer, via a verification token associated with the client computer. The verification token can be within or connected to the client computer. The account information can be stored on the portable device in an integrated circuit (IC) chip.

When the account information is received at the IP Gateway server computer, the server computer can then generate a dynamic verification value (dCVV2). Once generated, the IP Gateway server computer can transmit the dynamic verification value (dCVV2) to the verification token associated with the client computer.

Before or after the user receives the dynamic verification value, the user then initiates a transaction with a merchant such as an online merchant. During the transaction, the user provides his payment information to a check out page on the merchant's website. The payment information may also be automatically form-filled by the verification token in a payment page of a merchant website. The merchant's computer then generates a first authorization request message that includes a first verification value. The authorization request message includes data associated with a portable device of the user. The first verification value may be the dynamic verification value (dCVV2). The dynamic verification value (dCVV2) may be placed in the authorization request message in a location that is used for the conventional static verification value (CVV2) which may be printed on the back of debit/credit cards. The dynamic verification value is received at a client computer from a server computer through the first communication channel.

The merchant sends the first authorization request message to an acquirer computer, which forwards the first authorization request message to the payment processing network. The payment processing network server computer then receives the first authorization message and generates a second authorization message that includes a second verification value. The second verification value may be a conventional static verification value (dCVV2).

When the payment processing network server computer receives the first authorization request message, it validates the first verification value (e.g., dynamic verification value (dCVV2)) associated with the first authorization request message. The payment processing network server computer receives a copy of the first verification value from the IP Gateway server computer and compares it with the one associated with the first authorization request message. If the first verification value matches with the one received from the IP Gateway server computer, the payment processing network server computer then generates a second authorization request message that includes a second verification value. The second verification value is in a format that can be processed by the issuer computer of the user's portable device.

Once the second authorization message is generated by the payment processing network server computer, it is forwarded to the issuer computer operated by the issuer of the user's portable device. The issuer computer can then decide whether or not to authorize the transaction. The transaction may or may not be authorized, as authorization may depend on a number of factors including, but not limited to the amount of credit or funds in the user's account, the likelihood of fraud, etc.

After the issuer computer decides whether or not to authorize the transaction, an authorization response message comprising the decision as to whether or not to authorize the transaction is sent back to the merchant computer 130 via the acquirer computer and the payment processing network.

At a later point in time, a clearing and settlement process can take place between the various acquirers, issuers, and the payment processing network.

Before discussing specific embodiments of the invention, some descriptions of some specific terms are provided below.

An "authorization request message" may be a message that includes an issuer computer account identifier. The issuer computer account identifier may be a payment card account identifier associated with a payment card. The authorization request message may request that an issuer computer of the payment card authorize a transaction. An authorization request message according to an embodiment of the invention may comply with ISO 8583, which is a standard for systems that exchange electronic transactions made by cardholders using payment cards. An authorization request message may comprise data elements including, in addition to the account identifier, a service code, a CVV (card verification value), and an expiration date.

An "authorization response message" may be an issuing financial institution's electronic message reply to an authorization request message, which may include one or more of the following status indicators: Approval—transaction was approved; Decline—transaction was not approved; or Call Center—response pending more information, merchant must call the toll-free authorization phone number. It may also include an authorization code, which may be a code that a credit card issuing bank returns in an electronic message to the merchant's POS equipment that indicates approval of the transaction. The code serves as proof of authorization.

As used herein "dynamic verification value" (also referred to as dynamic device verification value, dynamic card verification value, dCVV2 or first verification value) may refer to a numeric or alpha-numeric value that is generated by an algorithm (e.g. encryption algorithm) that receives one or more account data as input. The dynamic verification value is introduced into the payment transaction and is used by a payment processing network to verify that the payment transaction has initiated from an authorized source.

As used herein "static verification value" (also referred to as card verification value, CVV2, or second verification value) may refer to a numeric or alpha-numeric value that is typically displayed on a portable device (e.g. debit/credit cards) used to make payment transaction. The static verification value can be included among the data in an authorization request message. The static verification value is used by the issuer computer of the portable device to determine whether the portable device was present at the time of the payment transaction.

A "validation indicator" may be a binary value in the authorization request message that indicates whether a verification value in the authorization request message is valid or not. The validation indicator may be set to "1" if the validation of the verification value is successful, and set to "0" if the validation fails.

A "chip type" portable device can be embedded with an integrated circuit, or chip, that communicates information to a point of transaction terminal. Chip type portable devices can include chip cards offer increased functionality (and security) through the combination of significant computing power and substantial data storage. Further, a chip type portable device can include a transaction-unique digital seal or signature in the chip proves its authenticity in an offline environment and prevents fraudsters from using fraudulent payment cards. It can be used to secure online payment transactions and protect cardholders, merchants and issuer computers against fraud through a transaction-unique online cryptogram. It may also be used to support enhanced user verification methods.

A chip type portable device may store data elements including a cryptogram, variable data elements such as counters, and other information. Counters, in particular, can be used to calculate verification value such as CVV, CVV2, dCVV, and dCVV2 verification values. For example, a portable device may include a counter and may generate a first verification value using the counter when each transaction that is conducted by the portable device. Thus, the counter can keep track of the number of transactions that are conducted by the portable device, and can cause the first verification value to change with each transaction. During a transaction, the first verification value can be passed to a central server computer, which may also maintain a second corresponding counter. The central server computer may independently generate a second verification value and may then compare it to the first verification value. If they match, or are within a predetermined range, then the transaction may be considered to be authentic. If the first and second verification values are very different, then this may indicate that the portable device that is being used to conduct the transaction is not authentic. Dynamic counters such as these are not stored on magnetic stripes on conventional payment cards, because conventional payment cards do not have the ability to manipulate data.

A "cryptogram" can refer to a numeric value that is the result of data elements entered into an algorithm and then encrypted, commonly used to validate data integrity. Cryptograms can include an Authorization Request Cryptogram (ARQC), an Authorization Response Cryptogram (ARPC), a Transaction Certificate (TC), and an Application Authorization Cryptogram (AAC).

A "chip type format" may include a data format that is compatible with carrying data from a chip type portable device. The data format may be part of a message (e.g., an authorization request message or an authorization response message). A chip type format may include chip-based data elements such as cryptograms and variable data elements such as counters. They may also include an account number, expiration date, and service code.

As used herein "magnetic stripe format" refers to an authorization request message formatted from the data stored in a magnetic stripe of a portable device. Data stored in the magnetic stripe of a portable device may be in the form of Track 1 ("International Air Transport Association") and Track 2 ("American Banking Association") data. Track 1 data may include cardholder's name as well as account number and other discretionary data. Track 2 data may include the cardholder's account, encrypted PIN, and other discretionary data.

A "communications channel" may include any suitable path for communication between two or more entities. Suitable communications channels may be present directly between two entities such as a client computer and a gateway server, or may include a number of different entities. Any suitable communications protocols may be used for communications channels according to embodiments of the invention.

"Account information" may include any suitable information associated with an account. Such information may be directly related to the account or may be derived from information related to the account. Examples of account information include a Primary Account Number (PAN), name, expiration date, CVV (card verification value), dCVV (dynamic card verification value), CVV2 (card verification value 2), and dCVV2 (dynamic card verification value 2). CVV2 is generally understood to be a static verification value associated with a portable payment device. dCVV2 is a dynamic verification value associated with a portable payment device. dCVV2 and CVV2 values are generally visible to a user (e.g., a consumer), whereas CVV and dCVV values are typically embedded in memory or authorization request message are not readily known to the user (although they are known to the issuer computer and payment processors).

As used herein "transaction data" may refer to data that may be associated with a transaction. In some embodiments, "transaction data" may be included in an authorization request message and an authorization response message. Such data may include account information such as a Primary Account Number (PAN), name, expiration date, CVV (card verification value), dCVV (dynamic card verification value), CVV2 (card verification value 2), and dCVV2 (dynamic card verification value 2), as well as merchant code, transaction amount, and any suitable data used to process a payment transaction.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

As used herein "determining whether the first verification value is valid" may refer to a validation process in the embodiments of the invention that is performed by a payment processing network or other entity, whereby a first verification value in an authorization request message is compared via a comparison software module to its duplicate copy received from a server computer (operated by an IP gateway) that originally has generated the first verification value. If the first verification value in the authorization request message matches with the duplicate copy received from the server computer operated by an IP Gateway, then the first verification value is valid. For example, the server computer operated by the IP Gateway may generate a first verification value "123" and send it to a client computer to be included in an authorization request message. A server computer operated by a payment processing network receives the authorization request message and compares the "123" value with a copy that it has previously received from the server computer (operated by the IP Gateway) that originally generated that first verification value ("123"). In some embodiments, the IP Gateway and the payment processing network may operate as one entity, in which case, upon receipt of an authorization request message, a server computer can regenerate the first verification value and compare it with the one in the authorization request message to see if there is a match.

Specific details regarding some of the above-described aspects are provided below. The specific details of the specific aspects may be combined in any suitable manner without departing from the spirit and scope of embodiments of the invention.

I. Exemplary Systems

Figure 1:
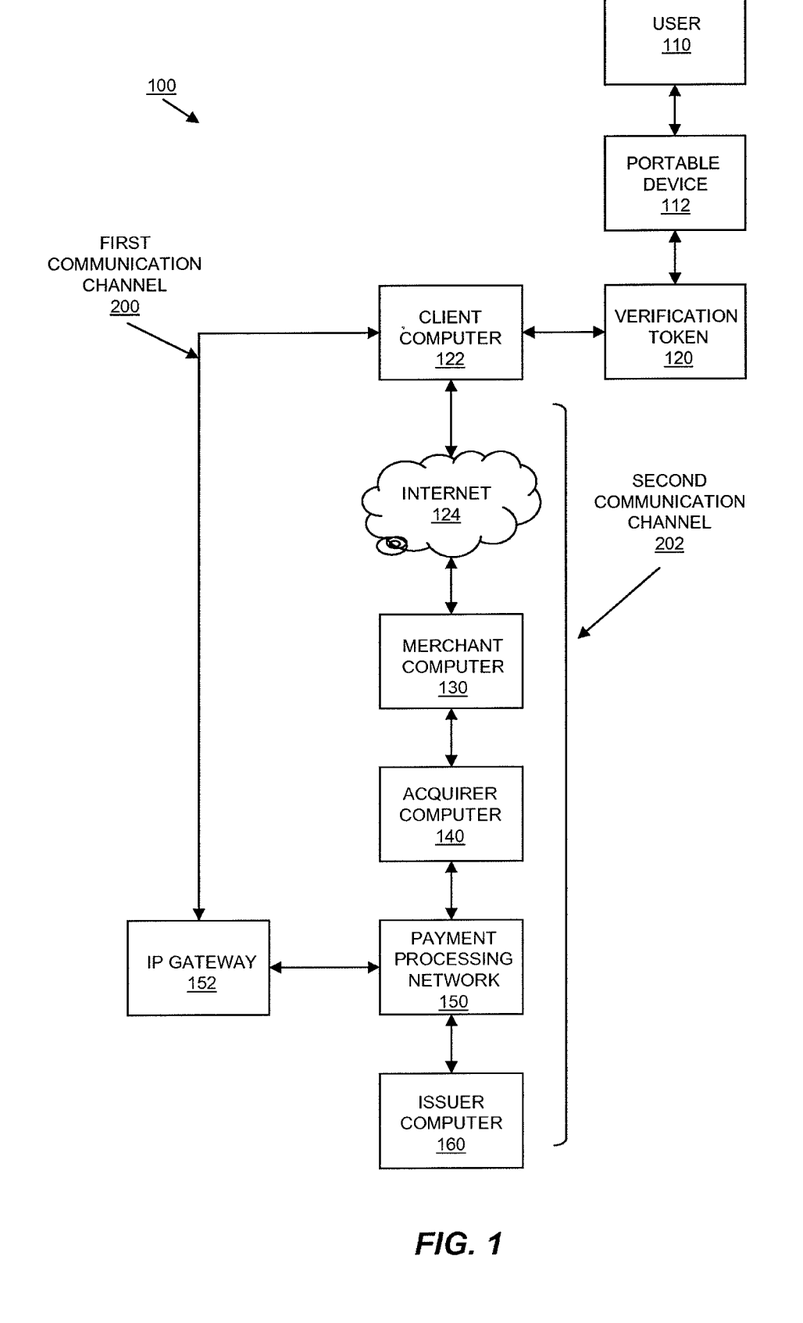
FIG. 1 shows a block diagram of a system according to an embodiment of the invention.

A system according to an embodiment of the invention is shown in FIG. 1. FIG. 1 shows a system 100 that can be used in an embodiment of the invention.

The system 100 may include a plurality of users, merchants, portable devices, acquirers, and issuer computers. As illustrated in FIG. 1, user 110 has access to the portable device 112 which is communication with the verification token 120 and client computer 122. Client computer 122 communicates with the IP Gateway 152 and the merchant computer 130. As illustrated in FIG. 1, in one embodiment, client computer 122 may communicate with the merchant computer 130 via a communication network such as the Internet 124. Merchant computer 130 is in communication with the acquirer computer 140 which is also in communication with the payment processing network 150. Payment processing network 150 is in communication with the issuer computer 160 and IP Gateway 152.

In the embodiments of the invention, verification token 120 may be associated with the client computer 122 that is used by a user 110. It may allow the client computer 122 to form a first secure communications channel 200 (an example of a first communication channel) to the IP Gateway 152, which may be in operative communication with the payment processing network 150. Although the IP Gateway 152 is shown as being a separate entity in FIG. 1, the IP Gateway 152 could be incorporated into the payment processing network 150, or could be omitted. In the latter situation, the first secure communications channel 200 could directly connect the payment processing network 150 and the client computer 122.

The payment processing network 150 may reside between the acquirer computer 140 and an issuer computer 160. The path which includes the merchant computer 130, the acquirer computer 140, and the payment processing network 150, may form at least part of a second communications channel 202.

Figure 2A:
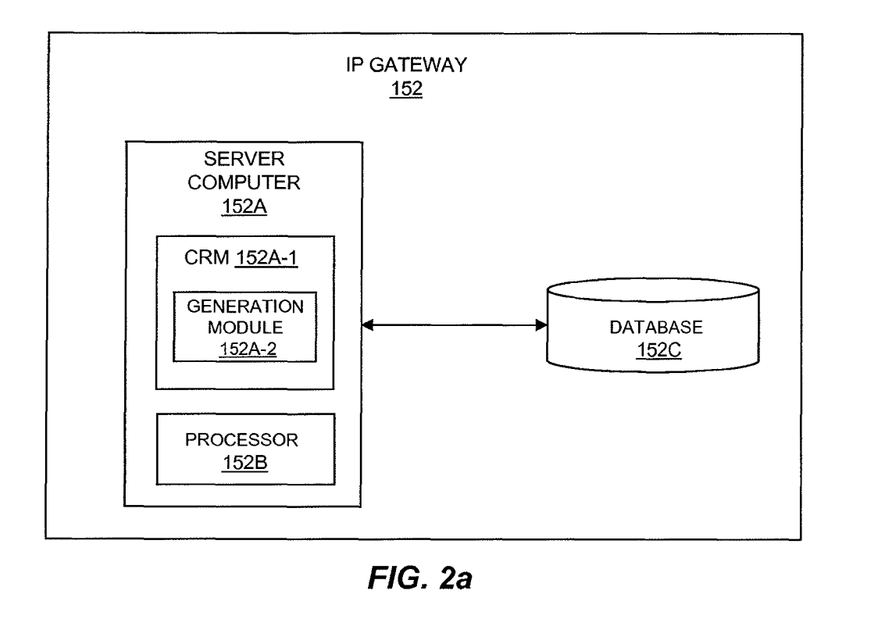
FIG. 2*a* shows a block diagram of some components of an IP Gateway according to an embodiment of the invention.

FIG. 2a illustrates some elements of the IP Gateway 152 according to an embodiment of the invention. As shown in FIG. 2a, IP Gateway 152 may include an IP Gateway server computer 152A and a database 152C. The server computer 152A may include a computer readable medium (CRM) 152A-1 and a processor 152B. The computer readable medium 152A-1 may include a generation module 152A-2. The generation module 152A-2 can be software program stored on the computer readable medium 154 and run by the processor 152B that generates a dynamic verification value. Such dynamic verification values may be 3, 4, 5 or more characters in length. They may be further created using any suitable data conversion process.

Figure 2B:
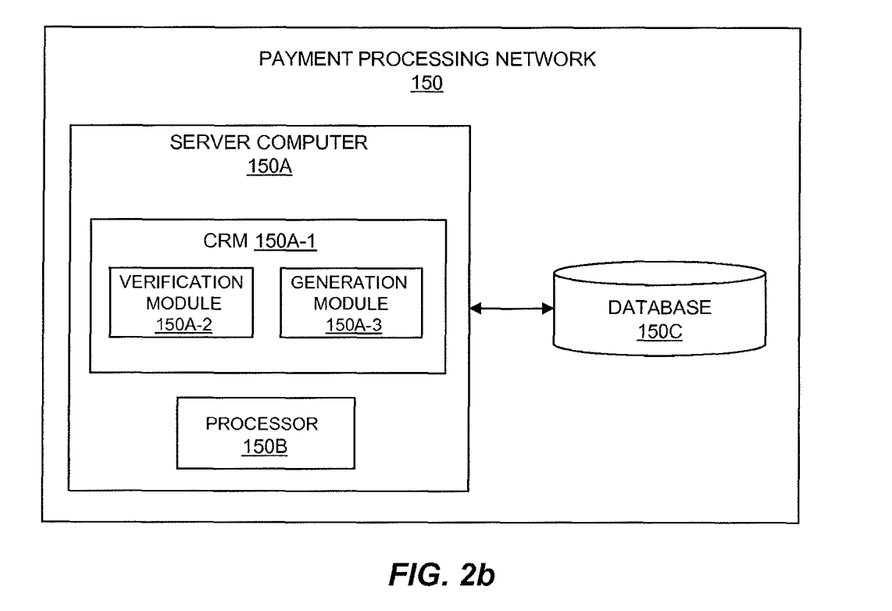
FIG. 2*b* shows a block diagram of some components of a payment processing network according to an embodiment of the invention.

FIG. 2b illustrates some elements of the payment processing network 150 according to an embodiment of the invention. As shown in FIG. 2b, payment processing network 150 may include a payment processing network server computer 150A and a database 150C. The server computer 150A may include a computer readable medium (CRM) 150A-1 and a processor 150B. The computer readable medium 150A-1 may include a verification module 150A-2 and a generation module 150A-3.

In some embodiments, the server computer 150A may comprise a processor, and a computer readable medium coupled to the processor. The computer readable medium includes code executable by the processor for implementing a method comprising: receiving a first authorization request message comprising a first verification value; determining whether the first verification value is valid; creating a second authorization request message comprising a second verification value; and sending the second authorization request message to an issuer computer.

The verification module 150A-2 can be a software program stored on the computer readable medium 150A-1, and run by the processor 150B, that monitors an authorization request message and compare various types of data in the authorization request message such as the dynamic verification value with the same type of data supplied by the IP Gateway 152 or any other entity to make sure the data that are part of the electronic payment transactions are accurate and are originated from an authorized source. The generation module 152A-3 can be software program stored on the computer readable medium 150A-1 and run by the processor 152B that generates a static verification value (e.g., CVV2).

User 110 refers to an individual or organization such as a business that is capable of purchasing goods or services or making any suitable payment transaction with merchant computer 130.

Figure 3A:
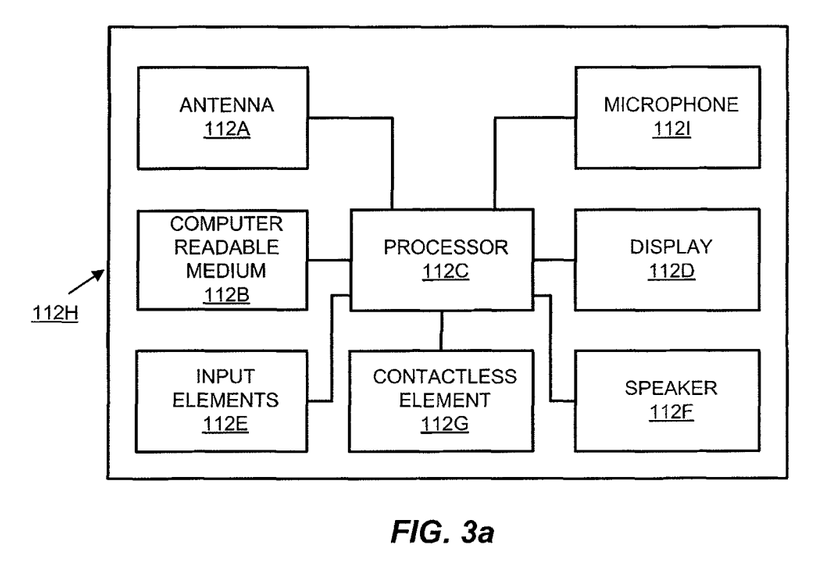
FIG. 3*a* shows a block diagram of functional components present in a mobile phone.
Figure 3B:
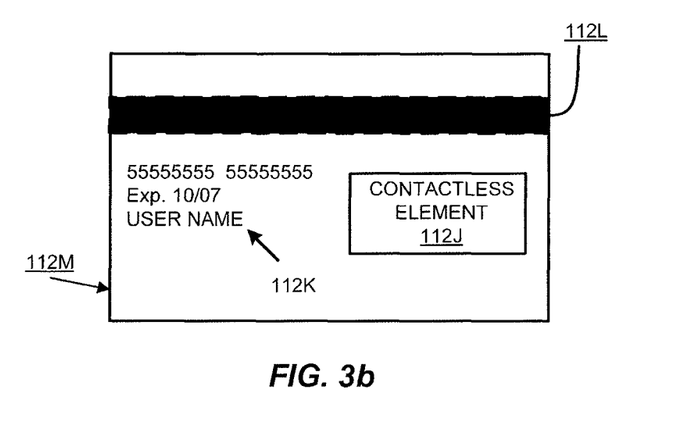
FIG. 3*b* shows a schematic depiction of a payment card.

The portable device 112 may be in any suitable form. In some embodiments, the portable devices are portable in nature. Suitable portable devices can be hand-held and compact so that they can fit into a consumer's wallet and/or pocket (e.g., pocket-sized). They may include smart cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card). Two specific examples of portable device 112 are shown in FIGS. 3a and 3b which will be described later.

The verification token 120 can be an electronic device configured to be coupled to, or can be present within, the client computer 122 and can be capable of wirelessly receiving card data from the portable device 112. Elements of the verification token 120 and their operation will be described later with reference to FIG. 4.

The client computer 122 may be in any suitable form. Examples of client computers may include phones, televisions, personal computers, laptop computers, PDAs, set top boxes, and other computing devices. In some embodiments, the client computer may comprise a processor, and a computer readable medium coupled to the processor. The client computer 122 may run an operating system such as Microsoft Windows™ and may have a suitable browser such as Internet Explorer™.

As used herein, an "issuer computer" is typically a computer operated by a business entity (e.g., a bank) which maintains financial accounts for the consumer and often issues a portable device such as a credit or debit card to the consumer. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

The payment processing network 150 may include data processing subsystems, networks, and operations used to support and deliver authorization services, exception file services, and clearing and settlement services. For example, the payment processing network 150 may comprise a server computer, coupled to a network interface, and a database of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 150 may use any suitable wired or wireless network, including the Internet.

The IP Gateway 152 refers to an entity that includes one or more servers and databases, and have access to various issuer computer data, transaction data and user data used to authenticate the portable consumer devices. IP Gateway 152 also generates and delivers notifications and alert messages to various delivery channels. IP Gateway 152 may be part of the payment processing network 150 or may be a separate entity in communication with payment processing network 150.

As used herein a "computer readable medium" or "computer readable storage medium" is typically a storage medium such a hard disk or any suitable type of data storage medium capable of storing data such as program codes.

The databases 152C and 150C (shown in FIGS. 2*a* and 2*b* respectively) may be capable of storing data from client computers. The databases 152C and 150C may also be in the form of stand-alone hard drives connected to one or more server computers that retrieve the data from the databases 152C and 150C as result of queries from client computers.

Referring now to FIG. 3*a*, a block diagram of a portable device 112 embodied as a mobile phone 112H that can be used in embodiments of the invention is provided. The mobile phone 112H can be both a notification device that can receive alert messages, as well as a portable device that can be used to make payments. The exemplary mobile phone 112H may comprise a computer readable medium and a body as shown in FIG. 3*a*. The computer readable medium 112B may be present within the body, or may be detachable from it. The body may be in the form a plastic substrate, housing, or other structure. The computer readable medium 112B may be in the form of (or may be included in) a memory that stores data (e.g., issuer computer account numbers, loyalty provider account numbers, etc.) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of the aforementioned information may be transmitted by the phone 112H.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. Track 1 is sometimes used by the airlines when securing reservations with a credit card. Track 2 ("American Banking Association") is currently and most commonly used. Track 2 is the track that is read by ATMs and credit card checkers. The ABA (American Banking Association) designed the specifications of Track 2 and all world banks abide by those specifications. Track 2 contains the cardholder's account, encrypted PIN, and other discretionary data.

The mobile phone 112H may further include a contactless element 112G, which is typically implemented in the form of a semiconductor chip (or other data storage element) with an associated wireless transfer (e.g., data transmission) element, such as an antenna. Contactless element 112G is associated with (e.g., embedded within) phone 112H and data or control instructions transmitted via a cellular network may be applied to contactless element 112G by means of a contactless element interface (not shown). The contactless element interface functions to permit the exchange of data and/or control instructions between the mobile device circuitry (and hence the cellular network) and an optional contactless element 112G.

Contactless element 112G is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile phone 112H and an interrogation device. Thus, the mobile phone 112H is capable of communicating and transferring data and/or control instructions via both cellular network and near field communications capability.

The mobile phone 112H can also include a processor 112C (e.g., a microprocessor) for processing the functions of the phone 112H and a display 112D to allow a consumer to see phone numbers and other information and messages. The mobile phone 112H can further include input elements 112E to allow a user to input information into the device, a speaker 112F to allow the user to hear voice communication, music, etc., and a microphone 112I to allow the user to transmit his/her voice through the mobile phone 112H. The phone 112H may also include an antenna 112A for wireless data transfer (e.g., data transmission).

If the portable device is in the form of a debit, credit, or smartcard, the portable device may also optionally have features such as magnetic strips. Such devices can operate in either a contact or contactless mode.

Another example of a portable device in the form of a payment card is shown in FIG. 3*b*. FIG. 3*b* shows a plastic substrate 112M. A contactless element 112J for interfacing with an access device can be present on or embedded within the plastic substrate 112M. User information 112K such as an account number, expiration date, and user name may be printed or embossed on the card. Also, a magnetic stripe 112L may also be on the plastic substrate 112M. The payment card may also comprise a microprocessor and/or memory chips with user data stored in them, such as an integrated circuit (IC) chip.

Figure 4:
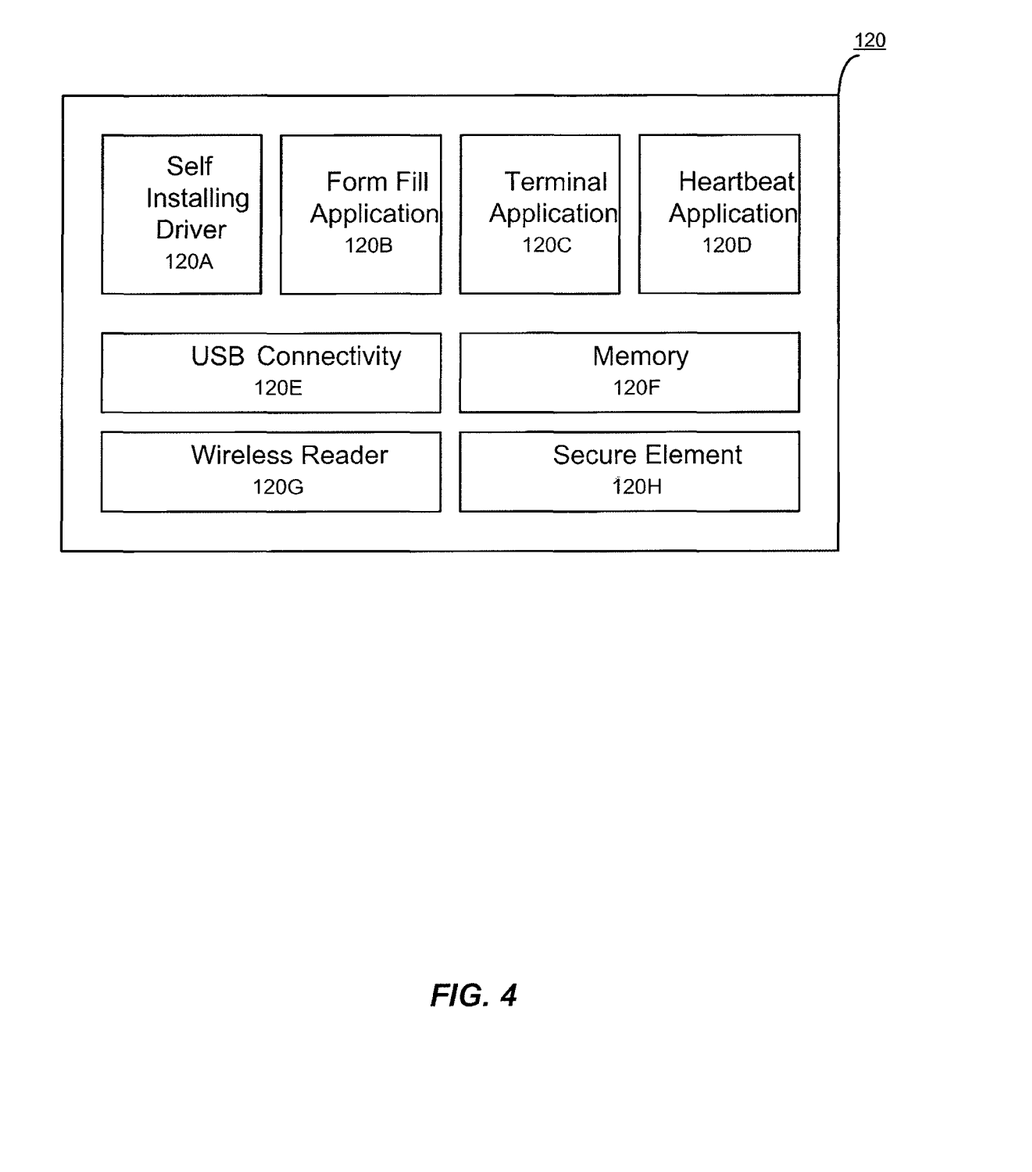
FIG. 4 shows a block diagram of some components of a verification token according to an embodiment of the invention.

FIG. 4 is a block diagram illustrating various components of the verification token 120 according to one embodiment.

The embodiment illustrated in FIG. 2 is a USB device that includes a USB connectivity module 120E, a secure element 120H (e.g., a smart card chip), a wireless/contactless reader 120G capable of reading card data (payment data) from a portable device, a built-in memory 120F, a self-installing driver 120A, a form fill application 120B, a terminal application 120C, and a heartbeat application 120D. The verification token 120 may also have other features such as a keyboard buffer capability and a unique serial number associated with the verification token. The verification token 120 has no footprint on the client computer 122 with internet connectivity when it is plugged in. The various components and modules on the verification token 120 can be used to implement methods according to embodiments of the invention.

Although FIG. 2 illustrates a verification token 120 as something similar to a USB stick, the verification token 120 may come in other forms. For example, it may be piece of hardware or other module installed in a computer, consumer device, or other device. For example, in other embodiments, the verification token may be housed in a computer and need not be a device that is physically separated from the computer.

II. Exemplary Methods

Figure 5:
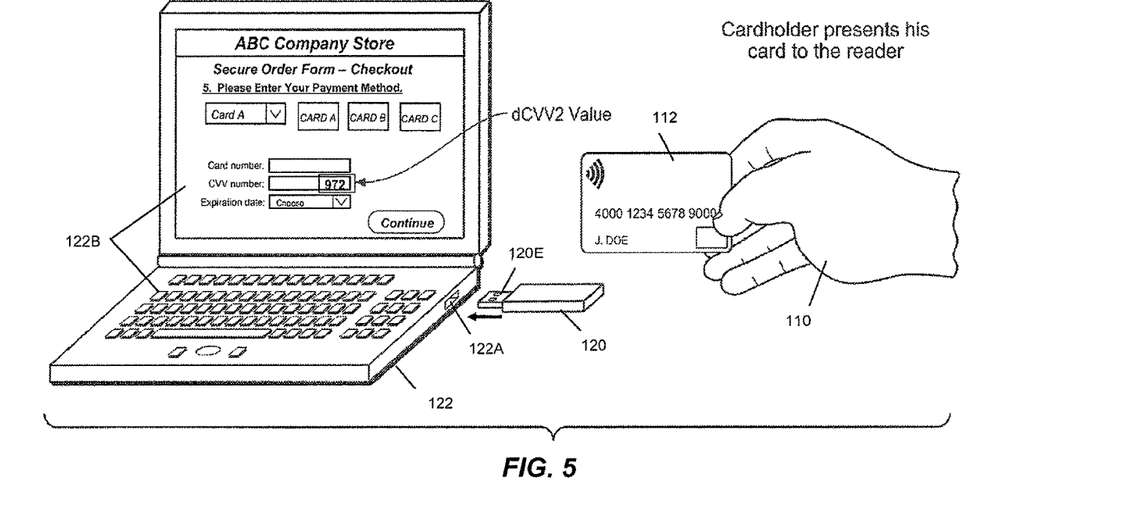
FIG. 5 shows a picture of a person interacting with a verification token that is associated with a client computer.
Figure 6:
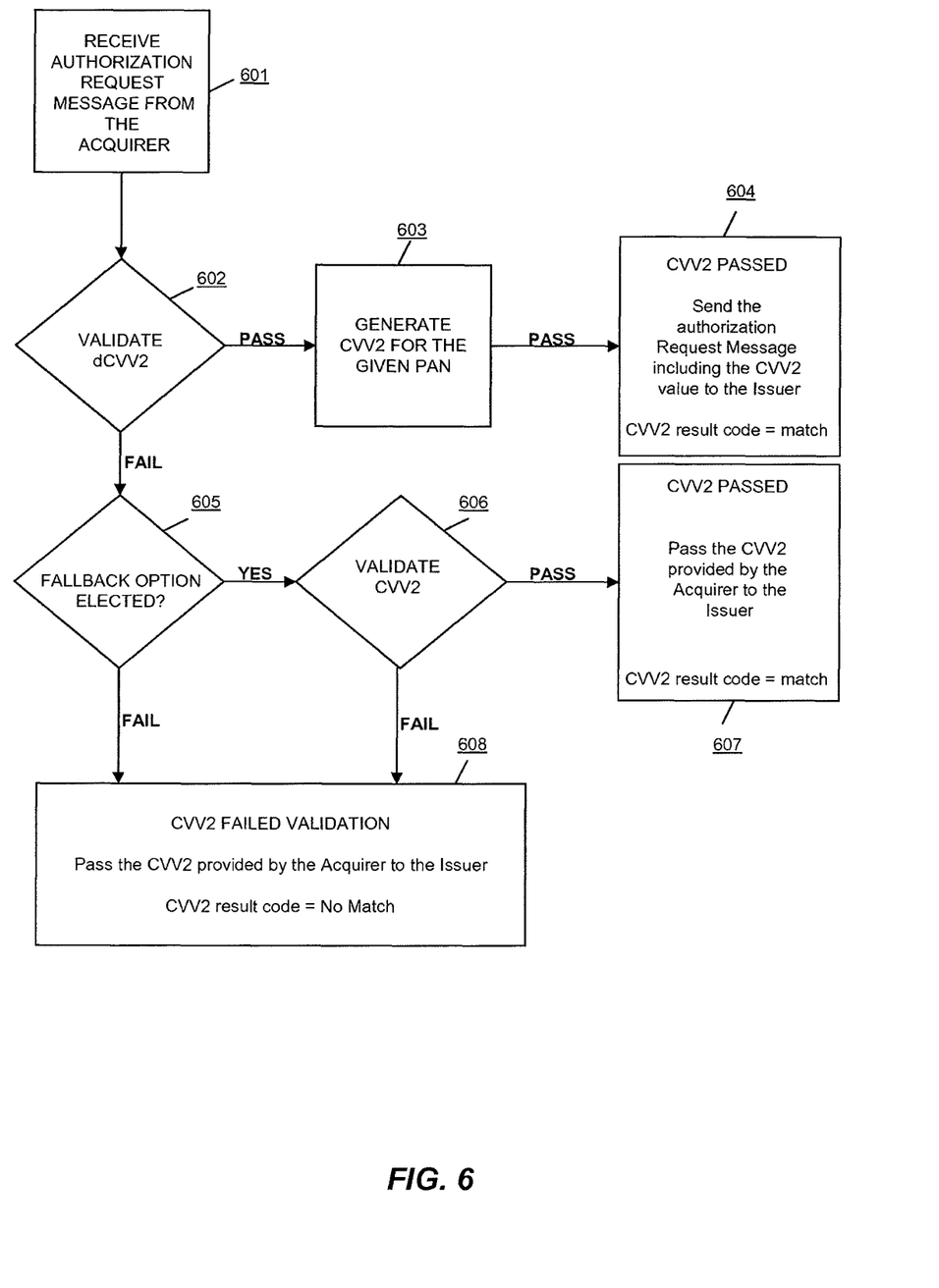
FIG. 6 shows a flowchart illustrating some of the steps involved in processing a transaction according to an embodiment of the invention.
Figure 7:
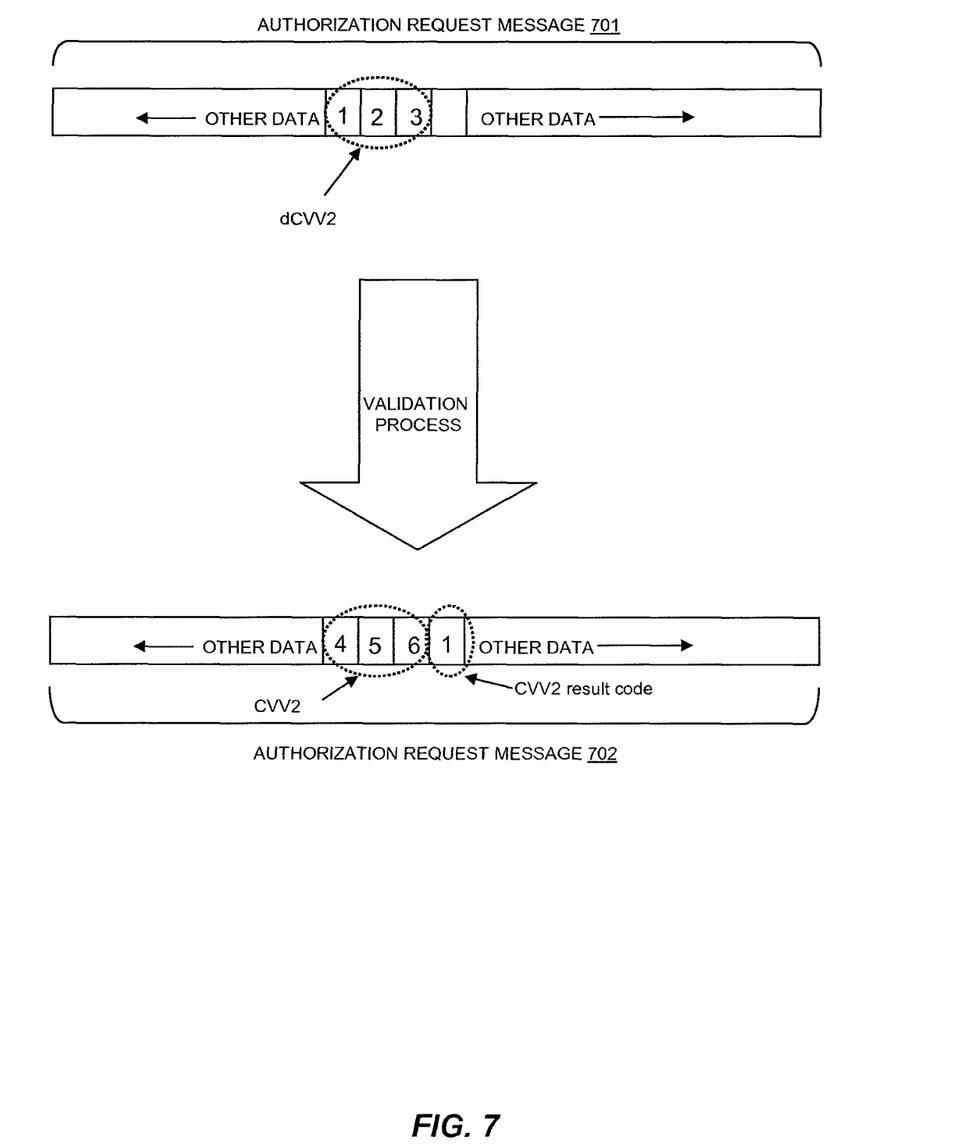
FIG. 7 shows an exemplary authorization request message before and after the validation process according to an embodiment of the invention.

Methods according to embodiments of the invention are described in FIGS. 5-7 with reference to the system elements in FIGS. 1-4.

Referring to FIGS. 1 and 5, prior to establishing the first communications channel 200, in embodiments of the invention, the user 110 may receive a verification token 120 from his or her financial institution. Alternatively, the user 110 may receive the verification token 120 from another entity on behalf of a financial institution.

As shown in FIG. 5, the user 110 can then connect the verification token 120 into the USB port 122A of his client computer 122 via a USB connector 120E. The client computer 122 can power the verification token 120. Once it is connected to the client computer 122, it can recognize the presence of the verification token 120 as a valid device, and the verification token 120 can self-install. The verification token 120 can then check with the client computer 122 to check for Internet connectivity. Note that although the client computer 122 and the verification token 120 are shown as separate devices in FIG. 5, in other embodiments, the verification token 120 may be part of the client computer 122.

If Internet connectivity is available, the verification token 120 can then automatically attempt to establish a background SSL session to the IP Gateway 152 so that it can be used as a part of an authentication process.

As shown in FIG. 4 verification token 120 may include an application, such as the self-installing driver 120A, so that the verification token 120 may install itself automatically after the verification token 120 is inserted into and recognized by the client computer 122. The token application is then able to connect to a backend host, perhaps at a predefined IP address, using a background secure SSL session. A terminal application 120C and heartbeat application 120D may be used to establish and maintain this session. If the session connection is successfully established, the token identifies itself to the IP Gateway 152 by providing its unique serial number and/or IP address to the IP Gateway 152. Other information may also be passed (e.g., password) to the IP Gateway 152 at this point.

The embodiment of the verification token 120 illustrated in FIG. 5 is a USB token that includes a USB connectivity module 120E, a secure element 120H (e.g., a chip such as a smart card chip, which has sufficient data and security protocols and hardware), a wireless/contactless reader 120G capable of reading payment data from a portable device, built in memory 120F, a self-installing driver 120A, a form fill application 120B, a terminal application 120C, and a heartbeat application 120D. The verification token 120 may also have other features such as a keyboard buffer capability and a unique serial number associated with the verification token 120. The verification token 120 can have little or no footprint on the client computer 120 when it is plugged into a standard client computer with Internet connectivity.

When the verification token 120 is operatively coupled with the client computer 122, the verification token 120 establishes a first communication channel 200 to the IP Gateway server computer 152A (FIG. 2a). The IP Gateway 152 can be in communication with a payment processing network 150. Note that in the description below, the IP Gateway server computer 152A and the payment processing network server computer 150A could be embodied by a single or separate computer apparatuses. Such computer apparatuses may function separately or together to facilitate the functions described herein.

After establishing the first communication channel 200 from the client computer 122 to the IP Gateway 152, the user 110 manipulates the portable device 112 so that it interacts with the client computer 122. For example, the user 110 may be asked to present the portable device 112 to complete the transaction while shopping from a merchant website. As described earlier, after the verification token 120 is placed into the client computer 122, and upon successful mutual authentication, the IP Gateway 152 may register the verification token 120 and its IP address for a session. A session key is associated with the session.

At some point during the process, the IP Gateway 152 can validate a token serial number associated with the verification token 120 and credentials from information accessible in a remote or local database (e.g. database 152C in FIG. 2a). If valid, IP Gateway 152 may calculate a UDK (unique derived key) for the token based on a master key and the serial number. A unique derived key (UDK) can be stored in the token secure element 120H. This host-token mutual authentication may use a Triple DES based algorithm.

Upon successful mutual authentication, the IP Gateway 152 can then register the token 120 and its IP address for this session. A session key is established upon mutual authentication to support all the communication for that session between the verification token 120 and the host. All the data exchanged between the token and the backend host can be encrypted and tunneled through an SSL session. The session could stay alive or be terminated or restarted at any time. At this point, the IP Gateway 152 is aware of token, serial number, session key, and IP address. In some embodiments, a dynamic verification value (dCVV2) dynamic verification value may be sent to the token at this time. In some embodiments, a dynamic verification value (dCVV2) will be sent only after it is requested by the verification token 120, as described in further detail below.

After the session is established, as shown in FIG. 5, the portable device 112 which may be a payment device, such as a credit card, can be used to interact with a verification token (e.g., a USB dongle) that is associated with the client computer 122. The portable device 112 can comprise a chip comprising chip card type data such as a dynamic counter, dynamic verification value, personal account number (PAN), cryptogram, user information, expiration date, card number, issuer computer information, etc.

In embodiments of the invention, the chip on the portable device 112 can interact with the verification token 120 through a contact interface and/or a wireless near field communication (NFC) (e.g., contactless) interface. Accordingly, as noted above, the verification token 120 can include a reader having a contact and/or contactless capabilities. During the interaction between the verification token 120 and the portable device 112, the verification token 120 can receive the chip type formatted data from the portable device 112 and communicate the data to the client computer 122, and then to the IP Gateway 152 and the payment processing network 150. The verification token 120 can further allow the client computer 122 to establish the first communications channel 200 with the IP Gateway 152, by using cryptograms generated each time the portable device 112 interacts with the verification token 120.

The user 110 may then initiate a request to receive a new dynamic verification value (dCVV2) value by presenting the portable device 112 to the verification token 120. The user 110 may do this by waving the portable device 112 near a wireless or contactless reader in the verification token 120. Alternatively, some embodiments may utilize readers than can read the magnetic stripe of a portable device.

The verification token 120 powers the portable device 112 to collect account information such as one or more of account numbers, crytograms, CVV and CVV2 values for a transaction. Other data that may be collected from the same or another source may include a session key with IP Gateway. The verification token 112 may then encrypt this collected data.

The client computer 122 then forwards the account information and other information to the IP Gateway 152 through the first communication channel 200, preferably in encrypted form.

The IP Gateway 152 then validates the received information. For example, the IP Gateway 152 may receive a request for dynamic verification value (dCVV2) from the verification token 120 including the encrypted Primary Account Number (PAN) and additional information (encrypted using the session key). The IP Gateway 152 can identify the Primary Account Number (PAN) associated with this request and validate the PAN and token relationship. If the information is validated, the IP Gateway 152 can generate a first verification value. The first verification value may be a dynamic verification value (dCVV2).

Next, the first verification value is sent from the IP Gateway 152 through the secure first communication channel 200 to the verification token 120. In some embodiments, the first verification value can include a dynamic verification value (dCVV2). However, the first verification value can be any value associated with the portable device 112 that can be utilized to identify and verify that portable device 112 during a transaction. The verification token 120 can store the verification value or complete an auto-fill of the merchant 130 check out page when the value is received. In other embodiments, the first verification value can be received and displayed on the client computer 122 for the user. This is also illustrated in FIG. 5.

Thus, in some embodiments, the verification token 120 may enter a dynamic verification value (dCVV2) value on a merchant website operated by the merchant computer 130. The verification token 120 may use a form-fill application 120 to form-fill the Primary Account Number (PAN) and the dynamic verification value (dCVV2). Other information may also be filled out by the token, such as shipping addresses, according to various embodiments. The user then conducts a transaction with a merchant using the dynamic verification value (dCVV2) and other payment data.

Once at the checkout page, the user can either manually enter the information required to complete the transaction or, optionally, an auto-complete feature can be included in the verification token 120. In the latter embodiment, the verification token 120 can include software module that includes instructions (e.g., computer code) executable by a processor for communicating the portable device data when the checkout page is presented to the user 110. This information can include the user's personal information including a payment card number, expiration date, billing information, name, and the first verification value (e.g., dCVV2) that was obtained through the first channel of communication from the IP Gateway 152. When the portable device data is entered into the checkout page and is confirmed (e.g., through a 'submit' or similar type button), the data is forwarded to the merchant computer 130 through the second communication channel 202, which can be securely established through a medium such as the Internet.

A first authorization request message is then generated by the merchant computer 130 and sent to the payment processing network 150 through the acquirer computer 140. The first authorization request message may be formatted in a legacy format such as a magnetic stripe data format. In the embodiments of the invention, when the first verification value is in the form of a dynamic verification value (dCVV2) that is received from the IP Gateway 152 via the process described above, the first authorization request message is generated with the dynamic verification value placed in the location of the static verification value (CVV2). The static verification value (CVV2) may be in the form of a printed number on the portable device 112 of the user 110.

In the legacy format of authorization request message (e.g. magnetic stripe data format) there is a location reserved for the static verification value (CVV2). The static verification value (CVV2) may be used by the issuer computer 160 to determine whether or not the portable device 112 was present at the time of the transaction. In the embodiments of the invention, the reserved location for the static verification value (CVV2) can be advantageously used to include and pass a dynamic verification value (dCVV2) through the second communication channel 202.

When the payment processing network 150 receives an authorization request message (first authorization request message) which may include a dynamic verification value (first verification value), it can validate the dynamic verification value and after a validation process, replace the dynamic verification value with the static verification (second verification value) that the issuer computer 160 expects to receive. This method advantageously allows the use of dynamic verification values in the payment transaction process without requiring the issuer computer 160 to make any modifications.

This method also advantageously allows the payment processing network 150 to process transactions that utilize the dynamic verification value (dCVV2) along with the transaction that use the legacy static verification value (CVV2). This novel process will now be described with reference to the flowchart illustrated in FIG. 6.

After the payment processing network 150 receives the first authorization request message (step 601), the payment processing network 150 can then use the first verification value, which may be in form of a dynamic verification value (dCVV2) associated with the Primary Account Number (PAN) to help authenticate a transaction involving the PAN. At step 602, the payment processing network 150 determines whether the dynamic verification value (dCVV2) (first verification value) is valid by comparing it with the duplicate copy of the dynamic verification value (dCVV2) received from the IP Gateway 152 to see if they match. The dynamic verification value (dCVV2) received from the IP Gateway 152 may be stored in the database 150C (shown in FIG. 2b) so it can be accessed for the validation process. This validation process may be performed by a software module such as the verification module 150A-2 (shown in FIG. 2b) running on the payment processing network server computer 150A. If the validation is successful, at step 603 the payment processing network 150 generates the static verification value (CVV2) associated with the portable device 112. This can be performed by a software module such as the generation module 150A-3 (shown in FIG. 2b) running on the payment processing network server computer 150A. The payment processing network then generates a second authorization request message by replacing the dynamic verification value (first verification value) with the static verification value (second verification value). The second authorization request message may also include a validation indicator (also referred to as the CVV2 result code) which may be in form of a flag indicating the result of the validation process.

At step 604 the second authorization request message that includes the static verification value (CVV2) is sent to the issuer computer 160 along with a validation indicator. FIG. 7 illustrates the generation of an exemplary second authorization request message after the validation process. FIG. 7 shows the authorization request message 701 that includes a dynamic verification value (first verification value). The authorization request message 701 then goes through the validation process and after it is verified that the dynamic verification value (dCVV2) matches with the one received from the IP Gateway 152, a static verification value (CVV2) is generated and placed in the location of the dynamic verification value (dCVV2) along with a validation indicator (i.e. CVV2 result code) which may be in the binary format with "1" indicating that the validation process was successful.

In the example shown in FIG. 7, the dynamic verification value (dCVV2) is "123" and after the validation process, the static verification value (CVV2) is calculated which is "456" in this example. The "456" value is what the issuer computer 160 expects to receive as part of the authorization request message. Therefore, it can be appreciated that the embodiments of the invention add a layer of security to the transaction process without disrupting the system and without forcing the issuer computer 160 to modify its systems.

Referring back to the flowchart of FIG. 6, if the validation process fails because the dynamic verification value is not valid or if the first authorization request message was send without the correct dynamic verification value (e.g. the static verification value was used, or a fraudster input the wrong verification value), at step 605 the payment processing network 150 determines whether the issuer computer 160 has elected a fallback option so that the payment processing network 150 can check whether the first authorization request message was sent with a static verification value. The "fallback option" can be selected by the issuer computers that wish to receive the authorization request message and use their own processes to determine whether or not the transaction is generated from an authorized source.

If the issuer computer 160 has selected the fallback option, then at step 606 the first authorization request message is checked for the presence of a static verification value (CVV2) and the static verification value is validated. The payment processing network 150 can generate (i.e. recalculate) the static verification value associated with the portable device that was used for the transaction. The static verification value can be generated form the data associated with the portable device of the user such as the Primary Account Number (PAN).

If the verification value in the first authorization request message that is received from the acquirer computer matches with the static verification value (CVV2) associated with the portable device 112 used for the transaction, then at step 607 the payment processing network 150 passes the authorization request message along with the static verification value and a validation indicator indicating that the static verification value was validated and the portable device used is authentic. The validation indicator may be placed in the first authorization request message or optionally, a second authorization request message may be generated with the validation indicator.

If the fallback option was not elected at step 605 or the validation process fails at step 606, a second authorization request message may be formatted which include a validation indicator indicating that the static verification value in the first authorization request message did not match the correct value. Optionally, the payment processing network 150 passes the first authorization request message to the issuer computer 160 along with the same verification value (first verification value) that was received from the acquirer computer as part of the first authorization request message.

In this latter example, if the dCVV2 is "123" and the CVV2 expected by the issuer computer is "456," then the payment processing network can simply pass the value "123" to the issuer computer 160. Thus, the payment processing network 150 can knowingly pass on a value that the issuer computer 160 does not expect to see, if the payment processing network 150 determines that the dCVV2 originally received from the merchant was incorrect.

When the issuer computer 160 receives the authorization request message, it will then generate an authorization response message that indicates whether the transaction was approved or not. The authorization response message is sent to the payment processing network 150 which forwards it to the acquirer computer 140. The acquirer computer 140 then notifies the merchant computer 130 about the result.

It can be appreciated that the embodiments of the invention provide many advantages. By replacing the dynamic verification value (dCVV2) (first verification value) with the static verification value (CVV2) (second verification value), more security can be provided for the payment transactions without requiring the issuer computers to modify their infrastructure and transaction processing systems. Moreover, the novel embodiments of the invention allow the processing of both transactions that use the dynamic verification values and the ones that do not. Furthermore, by passing the authorization request message to the issuer computer even in those cases that the validation process fails, issuer computers can advantageously utilize their own validation processes and decide whether they want to authorize the transaction.

Figure 8:
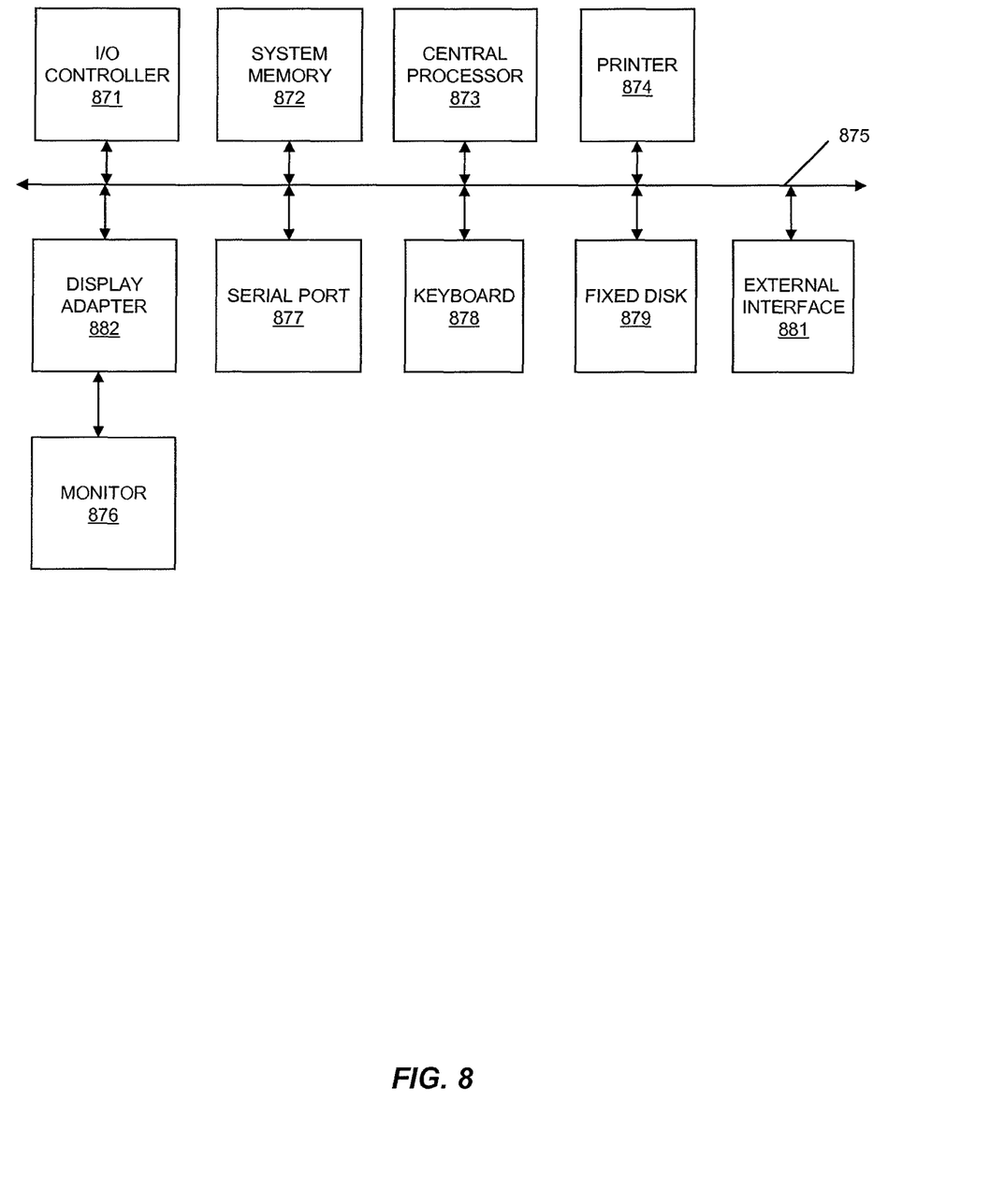
FIG. 8 shows a block diagram of a computer apparatus.

The various participants and elements (e.g., the issuer computer, the server, payment processing network, the IP Gateway, the merchant, the acquirer computer, and the user computer) in FIG. 1, can operate one or more computer apparatuses (e.g., a server computer) to facilitate the functions described herein. Any of the elements in FIG. 1 can use any suitable number of subsystems to facilitate the functions described in the systems and methods described in previous sections. Examples of such subsystems or components are shown in FIG. 8. The subsystems shown in FIG. 8 are interconnected via a system bus 875. Additional subsystems such as a printer 874, keyboard 878, fixed disk 879 (or other memory comprising computer readable media), monitor 876, which is coupled to display adapter 872, and others are shown. Peripherals and input/output (I/O) devices, which coupled to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 can embody a computer readable medium.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer comprising:
a processor; and
a non-transitory computer readable storage medium coupled to the processor having code stored thereon which is executable by the processor for implementing a method, the method comprising:
receiving, at the server computer, a first authorization request message for a transaction, the first authorization request message comprising an account identifier and a dynamic verification value, the dynamic verification value being stored, in the first authorization request message, in a data field reserved for static verification values;
determining, by the server computer, whether the dynamic verification value is a valid dynamic verification value;
responsive to determining that the dynamic verification value is a valid dynamic verification value:
generating, by the server computer, a second authorization request message comprising the account identifier and a static verification value that replaces the valid dynamic verification value stored in the data field reserved for static verification values, and
sending, by the server computer to an issuer computer operated by an issuer of the account identifier, the second authorization request message comprising the static verification value instead of the first authorization request message comprising the valid dynamic verification value; and
responsive to determining that the dynamic verification value is not a valid dynamic verification value:
sending, by the server computer to the issuer computer operated by the issuer of the account identifier, the first authorization request message comprising the dynamic verification value stored in the data field reserved for static verification values, and
receiving, from the issuer computer, an authorization response message indicating that the transaction is denied, because the dynamic verification value that was received by the issuer computer was not a correct static verification value associated with the account identifier.

2. The server computer of claim 1, wherein the static verification value is generated based on transaction data in the first authorization request message for the transaction.

3. The server computer of claim 1, wherein the static verification value is associated with a portable device.

4. The server computer of claim 1, wherein the first authorization request message for the transaction includes data associated with a portable device.

5. The server computer of claim 4, wherein the portable device is a payment card.

6. The server computer of claim 4, wherein the portable device is a mobile phone.

7. The server computer of claim 1, wherein the second authorization request message for the transaction is in a magnetic stripe data format.

8. The server computer of claim 1, wherein the first authorization request message for the transaction is received from a first communication channel.

9. The server computer of claim 8, wherein the first communication channel is configured to establish communication between a client computer and an IP Gateway server computer coupled to a payment processing network comprising the server computer.

10. The server computer of claim 8, wherein the second authorization request message for the transaction is sent via a second communication channel different from the first communication channel to the issuer computer.

11. The server computer of claim 10, wherein the second communication channel is configured to establish communication between a payment processing network comprising the server computer and the issuer computer.

12. The server computer of claim 1, wherein the static verification value in the second authorization request message for the transaction is generated in a format that can be processed by the issuer computer.

13. A method comprising:
receiving, at a server computer, a first authorization request message for a transaction, the first authorization request message comprising an account identifier and a dynamic verification value, the dynamic verification value being stored, in the first authorization request message, in a data field reserved for static verification values;
determining, by the server computer, whether the dynamic verification value is a valid dynamic verification value;
responsive to determining that the dynamic verification value is a valid dynamic verification value:
generating, by the server computer, a second authorization request message comprising the account identifier and a static verification value that replaces the valid dynamic verification value stored in the data field reserved for static verification values, and
sending, by the server computer to an issuer computer operated by an issuer of the account identifier, the second authorization request message comprising the static verification value instead of the first authorization request message comprising the valid dynamic verification value; and
responsive to determining that the dynamic verification value is not a valid dynamic verification value:
sending, by the server computer to the issuer computer operated by the issuer of the account identifier, the first authorization request message comprising the dynamic verification value stored in the data field reserved for static verification values, and receiving, from the issuer computer, an authorization response message indicating that the transaction is denied, because the dynamic verification value that was received by the issuer computer was not a correct static verification value associated with the account identifier.

14. The method of claim 13 further comprising:
generating, by the server computer, the static verification value.

15. The method of claim 13, wherein the first authorization request message for the transaction is received from a merchant computer, which receives the dynamic verification value and the account identifier from a client computer operated by a user, after the client computer receives the static verification value from a portable device used by the user.

16. The method of claim 13, wherein the first authorization request message is received from a merchant computer, which receives the dynamic verification value and the account identifier from a client computer operated by a user, after the client computer receives the account identifier and the static verification value from a portable device used by the user using a verification token.

17. The method of claim 16, wherein the client computer transmits the account identifier and the static verification value that is received from the portable device to a gateway computer, wherein the gateway computer evaluates the static verification value and the account identifier, generates the dynamic verification value, and transmits the dynamic verification value to the client computer.

18. The method of claim 13, wherein the server computer is in a payment processing network.

19. A system comprising the server computer of claim 1 and the issuer computer in communication with the server computer.

20. The system of claim 19, wherein the server computer is in a payment processing network.

* * * * *